United States Patent
Costache et al.

(10) Patent No.: US 11,853,815 B1
(45) Date of Patent: Dec. 26, 2023

(54) EVENT-BASED TASK PROCESSING SYSTEM AND METHOD BASED ON A STATEFUL DISTRIBUTED STREAMING QUEUE

(71) Applicant: JPMorgan Chase Bank, N.A., New York, NY (US)

(72) Inventors: Stefania Costache, London (GB); Ioana Nistoreanu, London (GB); Niraj Khandekar, Manhattan, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/876,253

(22) Filed: Jul. 28, 2022

(51) Int. Cl.
*G06F 9/54* (2006.01)
*G06F 9/48* (2006.01)

(52) U.S. Cl.
CPC ............ *G06F 9/542* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 2004/0024897 A1* | 2/2004 | Ladd | G06F 9/546 709/246 |
| 2020/0401444 A1* | 12/2020 | Hirota | G06F 9/52 |
| 2021/0200582 A1* | 7/2021 | Wei | G06F 13/24 |

* cited by examiner

*Primary Examiner* — Craig C Dorais
(74) *Attorney, Agent, or Firm* — GREENBLUM & BERNSTEIN, P.L.C.

(57) ABSTRACT

Various methods, apparatuses/systems, and media for event-based task processing are disclosed. The system includes a processor and a memory operatively connected to the processor via a communication interface. The processor defines a stateful distributed stream queue as a streaming queue which holds stateful computational requests generated at a stream of events, wherein each request contains a context and a collection of queue tasks processed by workers dedicated to the queue; runs the stateful distributed stream queue on a cloud infrastructure; implements the stateful computational requests, by utilizing the stateful distributed stream queue, at the stream of events; and clusters the queue tasks into affinity sub-queues by implementing configurable classification criteria to indicate that their computation is sped up on particular workers, while workers process tasks specific to their affinity; and implements abstractions for submitting and automatically re-computing the queue tasks while maintaining queue state between streaming events.

20 Claims, 11 Drawing Sheets

EVENT-BASED TASK PROCESSING SYSTEM AND METHOD BASED ON A STATEFUL DISTRIBUTED STREAMING QUEUE

TECHNICAL FIELD

This disclosure generally relates to task processing, and, more particularly, to methods and apparatuses for implementing a platform and language agnostic event-based task processing module configured to utilize a distributed queue to store tasks (or functions) and update them at runtime events to provide stateful computation, making elasticity, load-balancing and scalability needed to meet service level agreements (SLAs) easier to obtain.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Conventional task processing solutions, from batch to streaming, are typically based on centralized schedulers. This conventional scheduler may assign batches of work to workers and can periodically update the worker assignments to account for load variations. For example, to achieve an efficient distribution, the scheduler may require: i) accurate information regarding compute processing times on workers, which is difficult to obtain; ii) to account for possible performance variations and compute resource heterogeneity, such optimal distribution is well-known to be an NP (non-deterministic polynomial time) complete problem; iii) to meet stringent pre-defined SLAs (upper bound on processing latency). Moreover, fault tolerance support, needed to minimize eventual delays in case of (infrastructure and process) failures, is limited, as not only the scheduler has to be resilient in case of failures (possibly by reconstructing its lost state) but it also must reassign tasks in case of worker failures.

Decentralized queuing and scheduling solutions are often proposed in conventional task processing solutions. According to some conventional examples, multiple stateless schedulers distribute calculations to local worker queues; rely on keeping the queue and cluster state in a data storage shared among multiple schedulers; workers fetch tasks from a queue stored in a fast access in-memory data store, etc. However, these solutions do not account for stateful computation, i.e., where tasks are repeatedly executed and updated at a stream of events. Moreover, they provide limited support for fault tolerance, where failures are usually detected through worker hearth-beats, and stringent SLAs, with no support for performance monitoring and elastic scaling of workers.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic event-based task processing module configured to utilize a distributed queue to store tasks (or functions) and update them at runtime events to provide stateful computation, making elasticity, load-balancing and scalability needed to meet SLAs easier to obtain, but the disclosure is not limited thereto. For example, the present disclosure, through one or more of its various aspects, embodiments, and/or specific features or sub-components, provides, among other features, various systems, servers, devices, methods, media, programs, and platforms for implementing a platform and language agnostic event-based task processing module configured to simplify an event processing architecture for the execution of parallel applications on cloud and high performance computing platforms with applicability to the financial domain and beyond; provide dynamic SLA management; provide controllable and stable performance; decrease the compute cost compared to on-premise through elastic management of resources based on SLA trade-offs, etc., but the disclosure is not limited thereto.

According to an aspect of the present disclosure, a method for event-based task processing by utilizing one or more processors along with allocated memory is disclosed. The method may include: defining a stateful distributed stream queue as a streaming queue which holds stateful computational requests generated at a stream of events, wherein each request contains a context and a collection of queue tasks processed by workers dedicated to the queue; running the stateful distributed stream queue on a cloud infrastructure; implementing the stateful computational requests, by utilizing the stateful distributed stream queue, at the stream of events; and clustering the queue tasks into affinity sub-queues by implementing configurable classification criteria to indicate that their computation is sped up on particular workers, while workers process tasks specific to their affinity; and implementing abstractions for submitting and automatically re-computing the queue tasks while maintaining queue state between streaming events.

According to a further aspect of the present disclosure, the context may include meta information and tasks may include custom computation code invoked for every event.

According to another aspect of the present disclosure, the streaming queue may be fault-tolerant with its state stored in a fast-access in-memory cloud storage, wherein the state may include one or more of the following states: request state, task data, current assignment task to worker, and worker state, but the disclosure is not limited thereto.

According to yet another aspect of the present disclosure, the method may further include: partitioning and replicating the state, wherein partitions include a state from one or multiple streaming queues and hosted on different servers so that the state access is not a bottleneck when a plurality of workers are accessing it concurrently.

According to an aspect of the present disclosure, in an event of worker failures, the method may further include: automatically resubmitting and reprocessing tasks assigned to a specific worker on the streaming queue at real-time monitored failure events from the cloud infrastructure to minimize the reprocessing time.

According to a further aspect of the present disclosure, the method may further include: calling a streaming queue application programming interface to compute collections of tasks and aggregate results at the stream of events and to define target latency for an end-to-end computation time per event.

According to another aspect of the present disclosure, an application or service may utilize the streaming queue application programming interface.

According to an aspect of the present disclosure, a system for event-based task processing is disclosed. The system may include: a processor; and a memory operatively connected to the processor via a communication interface, the memory storing computer readable instructions, when executed, may cause the processor to: define a stateful distributed stream queue as a streaming queue which holds stateful computational requests generated at a stream of events, wherein each request contains a context and a collection of queue tasks processed by workers dedicated to the queue; run the stateful distributed stream queue on a cloud infrastructure; implement the stateful computational requests, by utilizing the stateful distributed stream queue, at the stream of events; and cluster the queue tasks into affinity sub-queues by implementing configurable classification criteria to indicate that their computation is sped up on particular workers, while workers process tasks specific to their affinity; and implement abstractions for submitting and automatically re-computing the queue tasks while maintaining queue state between streaming events.

According to a further aspect of the present disclosure, the processor is further configured to: partition and replicate the state, wherein partitions include a state from one or multiple streaming queues and hosted on different servers so that the state access is not a bottleneck when a plurality of workers are accessing it concurrently.

According to another aspect of the present disclosure, in an event of worker failures, the processor is further configured to: automatically resubmit and reprocess tasks assigned to a specific worker on the streaming queue at real-time monitored failure events from the cloud infrastructure to minimize the reprocessing time.

According to yet another aspect of the present disclosure, the processor is further configured to: call a streaming queue application programming interface to compute collections of tasks and aggregate results at the stream of events and to define target latency for an end-to-end computation time per event.

According to an aspect of the present disclosure, a non-transitory computer readable medium configured to store instructions for event-based task processing is disclosed. The instructions, when executed, may cause a processor to perform the following: defining a stateful distributed stream queue as a streaming queue which holds stateful computational requests generated at a stream of events, wherein each request contains a context and a collection of queue tasks processed by workers dedicated to the queue; running the stateful distributed stream queue on a cloud infrastructure; implementing the stateful computational requests, by utilizing the stateful distributed stream queue, at the stream of events; and clustering the queue tasks into affinity sub-queues by implementing configurable classification criteria to indicate that their computation is sped up on particular workers, while workers process tasks specific to their affinity; and implementing abstractions for submitting and automatically re-computing the queue tasks while maintaining queue state between streaming events.

According to a further aspect of the present disclosure, the instructions, when executed, may further cause the processor to perform the following: partitioning and replicating the state, wherein partitions include a state from one or multiple streaming queues and hosted on different servers so that the state access is not a bottleneck when a plurality of workers are accessing it concurrently.

According to another aspect of the present disclosure, in an event of worker failures, the instructions, when executed, may further cause the processor to perform the following: automatically resubmitting and reprocessing tasks assigned to a specific worker on the streaming queue at real-time monitored failure events from the cloud infrastructure to minimize the reprocessing time.

According to yet another aspect of the present disclosure, the instructions, when executed, may further cause the processor to perform the following: calling a streaming queue application programming interface to compute collections of tasks and aggregate results at the stream of events and to define target latency for an end-to-end computation time per event.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
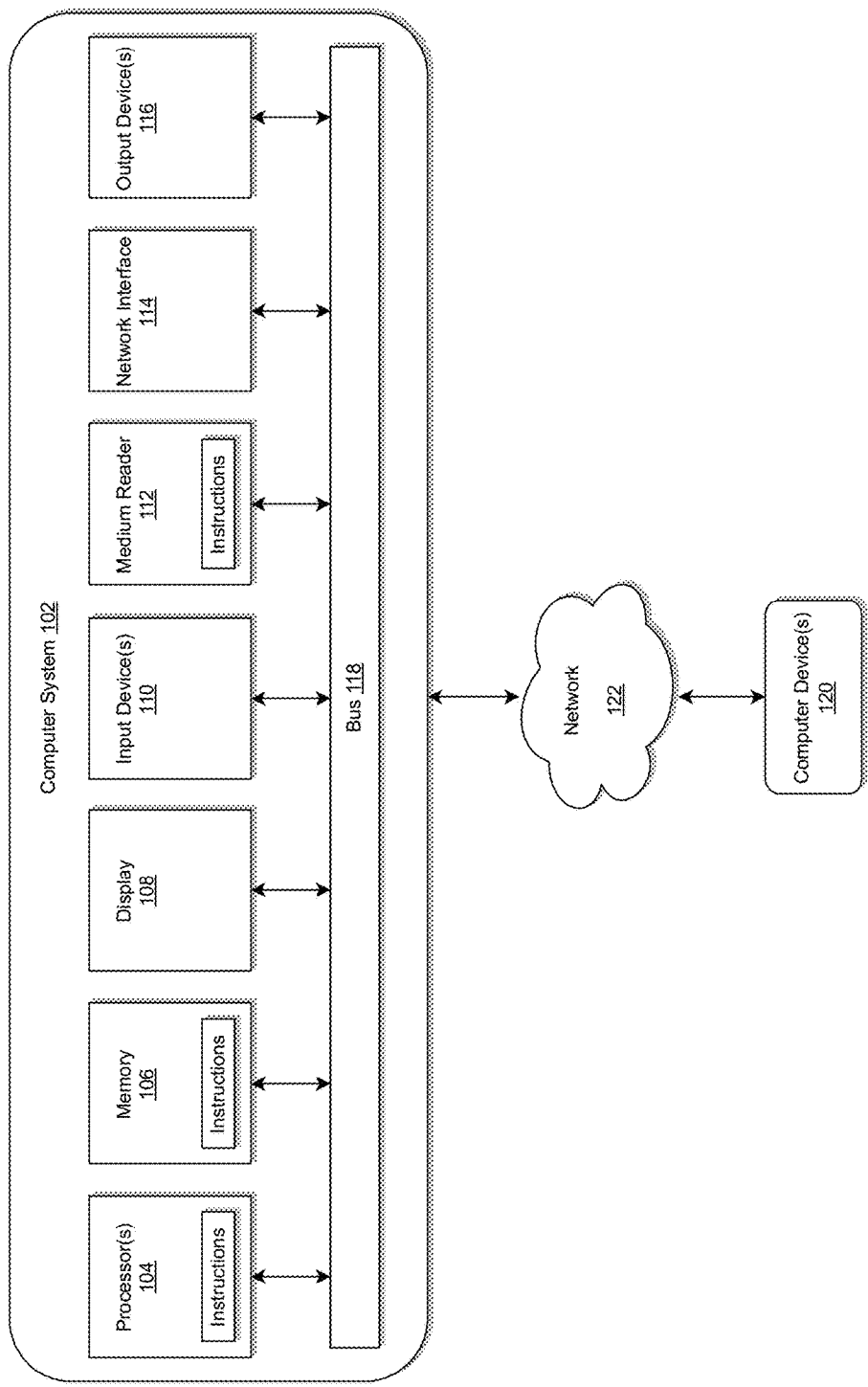
FIG. 1 illustrates a computer system for implementing a platform and language agnostic event-based task processing module configured to utilize a distributed queue to store tasks (or functions) and update them at runtime events to provide stateful computation in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for implementing a platform and language agnostic event-based task processing module configured to utilize a distributed queue to store tasks (or functions) and update them at runtime events to provide stateful computation in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionalities as described herein, and a processor described herein may be used to support a virtual processing environment.

The configuration/data files, according to exemplary embodiments, may be written using JSON (Java Script Object Notation), but the disclosure is not limited thereto. For example, the configuration/data files can easily be extended to other readable file formats such as XML, YAML, etc., or any other configuration-based languages.

Figure 2:
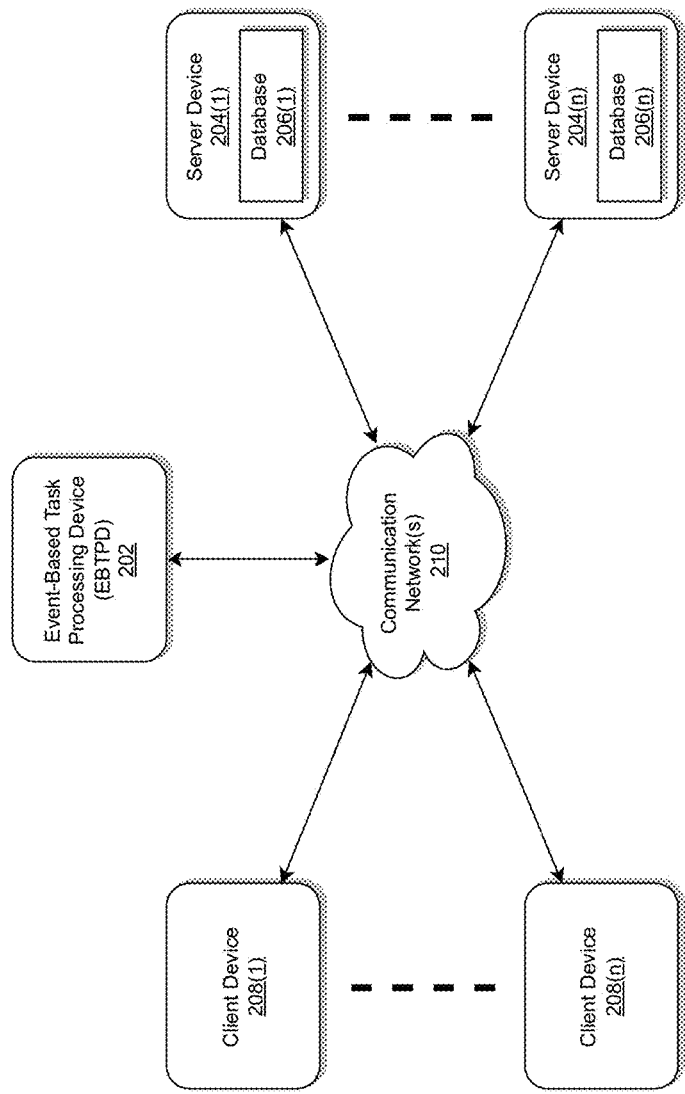
FIG. 2 illustrates an exemplary diagram of a network environment with a platform and language agnostic event-based task processing device in accordance with an exemplary embodiment.

Referring to FIG. 2, a schematic of an exemplary network environment 200 for implementing a platform and language agnostic event-based task processing device (EBTPD) to utilize a distributed queue to store tasks (or functions) and automatically update them at runtime events to provide stateful computation of the instant disclosure is illustrated.

According to exemplary embodiments, the above-described problems associated with conventional approach of task processing solutions may be overcome by implementing an EBTPD 202 as illustrated in FIG. 2 that may implement a platform and language agnostic event-based task processing module configured to utilize a distributed queue to store tasks (or functions) and update them at runtime events to provide stateful computation, making elasticity, load-balancing and scalability needed to meet SLAs easier to obtain, but the disclosure is not limited thereto.

The EBTPD 202 may be the same or similar to the computer system 102 as described with respect to FIG. 1.

The EBTPD 202 may store one or more applications that can include executable instructions that, when executed by the EBTPD 202, cause the EBTPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the EBTPD 202 itself, may be located in virtual server(s) running in a cloud-based computing environment rather than being tied to one or more specific physical network computing devices. Also, the application(s) may be running in one or more virtual machines (VMs) executing on the EBTPD 202. Additionally, in one or more embodiments of this technology, virtual machine(s) running on the EBTPD 202 may be managed or supervised by a hypervisor.

In the network environment 200 of FIG. 2, the EBTPD 202 is coupled to a plurality of server devices 204(1)-204(n) that hosts a plurality of databases 206(1)-206(n), and also to a plurality of client devices 208(1)-208(n) via communication network(s) 210. A communication interface of the EBTPD 202, such as the network interface 114 of the computer system 102 of FIG. 1, operatively couples and communicates between the EBTPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the EBTPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The EBTPD 202 may be a standalone device or integrated with one or more other devices or apparatuses, such as one or more of the server devices 204(1)-204(n), for example. In one particular example, the EBTPD 202 may be hosted by one of the server devices 204(1)-204(n), and other arrangements are also possible. Moreover, one or more of the devices of the EBTPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the EBTPD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the EBTPD 202 that may efficiently provide a platform for implementing a platform and language agnostic event-based task processing module configured to utilize a distributed queue to store tasks (or functions) and update them at runtime events to provide stateful computation, making elasticity, load-balancing and scalability needed to meet SLAs easier to obtain, but the disclosure is not limited thereto. According to exemplary embodiments, the client devices 208(1)-208(n) in this example may include any type of computing device that can facilitate the implementation of the EBTPD 202 that may efficiently provide a platform for implementing a platform and a language agnostic event-based task processing module configured to provide a consistent automated event-based task processing and state reconciliation mechanism for application resiliency on a multi cloud platform irrespective of the choice of underlying cloud platform, but the disclosure is not limited thereto.

The client devices 208(1)-208(n) may run interface applications, such as standard web browsers or standalone client applications, which may provide an interface to communicate with the EBTPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the EBTPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the EBTPD 202, the server devices 204(1)-204(n), or the client devices 208(1)-208(n), for example, may be configured to operate as virtual instances on the same physical machine. For example, one or more of the EBTPD 202, the server devices 204(1)-204(n), or the client devices 208(1)-208(n) may operate on the same physical device rather than as separate devices communicating through communication network(s) 210. Additionally, there may be more or fewer EBTPDs 202, server devices 204(1)-204(n), or client devices 208(1)-208(n) than illustrated in FIG. 2. According to exemplary embodiments, the EBTPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
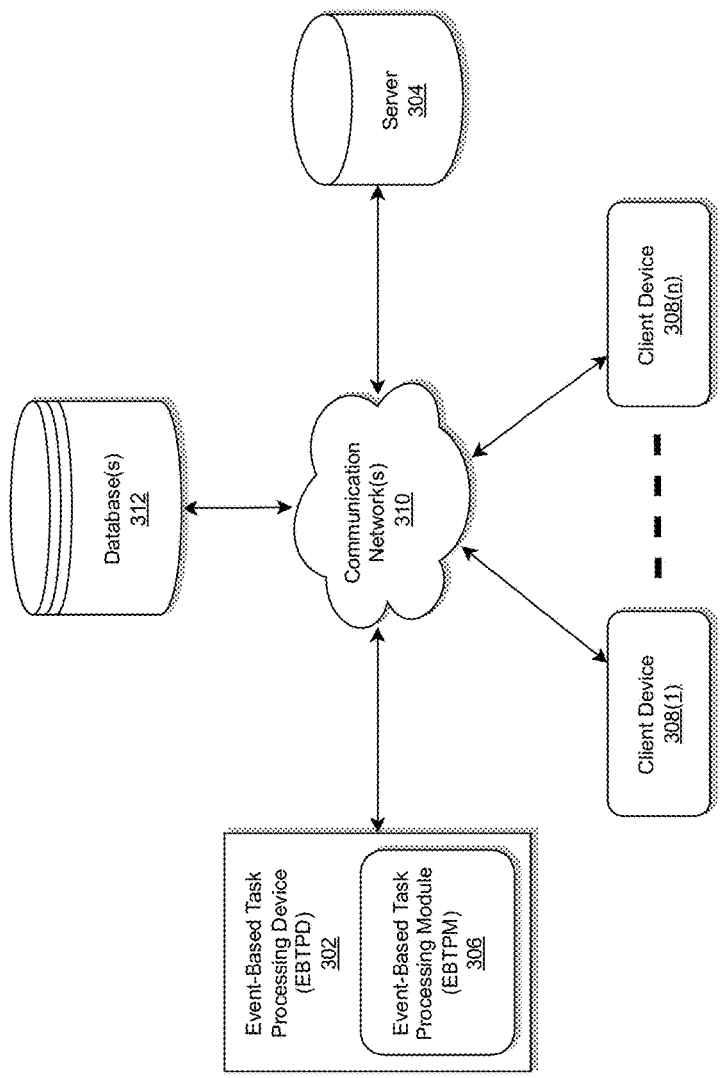
FIG. 3 illustrates a system diagram for implementing a platform and language agnostic event-based task processing device having a platform and language agnostic event-based task processing module in accordance with an exemplary embodiment.

FIG. 3 illustrates a system diagram for implementing a platform and language agnostic EBTPD having a platform and language agnostic event-based task processing module (EBTPM) in accordance with an exemplary embodiment.

As illustrated in FIG. 3, the system 300 may include an EBTPD 302 within which an EBTPM 306 is embedded, a server 304, a database(s) 312, a plurality of client devices 308(1) . . . 308(n), and a communication network 310.

According to exemplary embodiments, the EBTPD 302 including the EBTPM 306 may be connected to the server 304, and the database(s) 312 via the communication network 310. The EBTPD 302 may also be connected to the plurality of client devices 308(1) . . . 308(n) via the communication network 310, but the disclosure is not limited thereto.

According to exemplary embodiment, the EBTPD 302 is described and shown in FIG. 3 as including the EBTPM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a private or public cloud databases (i.e., AWS, S3, etc.), a log database (i.e., Splunk) that may produce programming for searching, monitoring, and analyzing machine-generated data via a Web-style interface, etc., but the disclosure is not limited thereto.

According to exemplary embodiments, the EBTPM 306 may be configured to receive real-time feed of data from the plurality of client devices 308(1) . . . 308(n) via the communication network 310.

As will be described below, the EBTPM 306 may be configured to define a stateful distributed stream queue as a streaming queue which holds stateful computational requests generated at a stream of events, wherein each request contains a context and a collection of queue tasks processed by workers dedicated to the queue; run the stateful distributed stream queue on a cloud infrastructure; implement the stateful computational requests, by utilizing the stateful distributed stream queue, at the stream of events; and cluster the queue tasks into affinity sub-queues by implementing configurable classification criteria to indicate that their computation is sped up on particular workers, while workers process tasks specific to their affinity; and implement abstractions for submitting and automatically re-computing the queue tasks while maintaining queue state between streaming events, but the disclosure is not limited thereto.

The plurality of client devices 308(1) . . . 308(n) are illustrated as being in communication with the EBTPD 302. In this regard, the plurality of client devices 308(1) . . . 308(n) may be "clients" of the EBTPD 302 and are described herein as such. Nevertheless, it is to be known and understood that the plurality of client devices 308(1) . . . 308(n) need not necessarily be "clients" of the EBTPD 302, or any entity described in association therewith herein. Any additional or alternative relationship may exist between either or both of the plurality of client devices 308(1) . . . 308(n) and the EBTPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the EBTPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The EBTPD 302 may be the same or similar to the EBTPD 202 as described with respect to FIG. 2, including any features or combination of features described with respect thereto.

Figure 4:
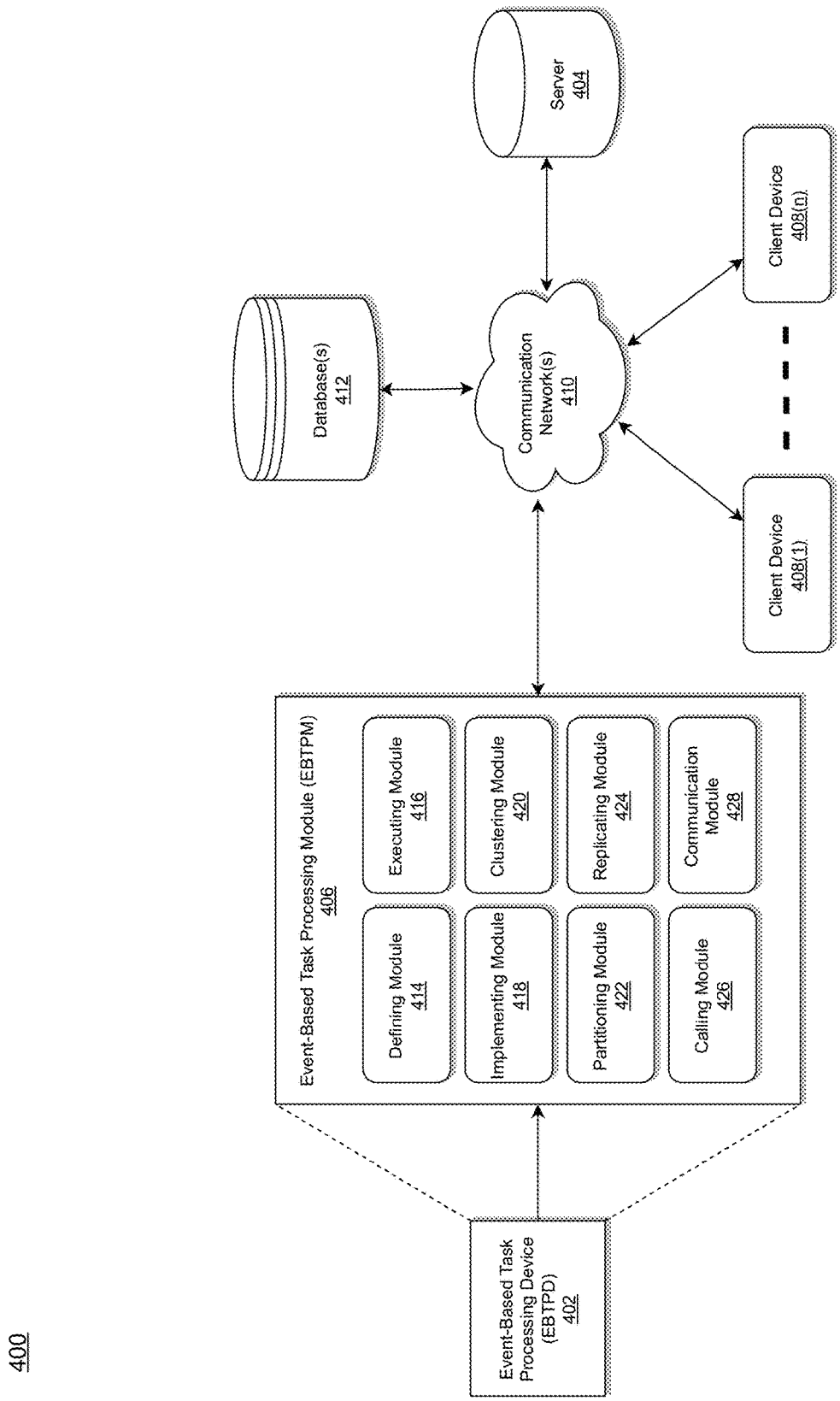
FIG. 4 illustrates a system diagram for implementing a platform and language agnostic event-based task processing module of FIG. 3 in accordance with an exemplary embodiment.

FIG. 4 illustrates a system diagram for implementing a platform and language agnostic EBTPM of FIG. 3 in accordance with an exemplary embodiment.

According to exemplary embodiments, the system 400 may include a platform and language agnostic EBTPD 402 within which a platform and language agnostic EBTPM 406 is embedded, a server 404, database(s) 412, and a communication network 410.

According to exemplary embodiments, the EBTPD 402 including the EBTPM 406 may be connected to the server 404 and the database(s) 412 via the communication network 410. The EBTPD 402 may also be connected to the plurality of client devices 408(1)-408(n) via the communication network 410, but the disclosure is not limited thereto. The EBTPM 406, the server 404, the plurality of client devices 408(1)-408(n), the database(s) 412, the communication network 410 as illustrated in FIG. 4 may be the same or similar to the EBTPM 306, the server 304, the plurality of client devices 308(1)-308(n), the database(s) 312, the communication network 310, respectively, as illustrated in FIG. 3.

According to exemplary embodiments, as illustrated in FIG. 4, the EBTPM 406 may include a defining module 414, an executing module 416, an implementing module 418, a clustering module 420, a partitioning module 422, a replicating module 424, a calling module 426, and a communication module 428. According to exemplary embodiments, interactions and data exchange among these modules included in the EBTPM 406 provide the advantageous effects of the disclosed invention. Functionalities of each module of FIG. 4 will be described in detail below.

According to exemplary embodiments, each of the defining module 414, executing module 416, implementing module 418, clustering module 420, partitioning module 422, replicating module 424, calling module 426, and the communication module 428 of the EBTPM 406 may be physically implemented by electronic (or optical) circuits such as logic circuits, discrete components, microprocessors, hardwired circuits, memory elements, wiring connections, and the like, which may be formed using semiconductor-based fabrication techniques or other manufacturing technologies.

According to exemplary embodiments, each of the defining module 414, executing module 416, implementing module 418, clustering module 420, partitioning module 422, replicating module 424, calling module 426, and the communication module 428 of the EBTPM 406 may be implemented by microprocessors or similar, and may be programmed using software (e.g., microcode) to perform various functions discussed herein and may optionally be driven by firmware and/or software.

Alternatively, according to exemplary embodiments, each of the defining module 414, executing module 416, implementing module 418, clustering module 420, partitioning module 422, replicating module 424, calling module 426, and the communication module 428 of the EBTPM 406 may be implemented by dedicated hardware, or as a combination of dedicated hardware to perform some functions and a processor (e.g., one or more programmed microprocessors and associated circuitry) to perform other functions.

According to exemplary embodiments, each of the defining module 414, executing module 416, implementing module 418, clustering module 420, partitioning module 422, replicating module 424, calling module 426, and the communication module 428 of the EBTPM 406 may be called via corresponding API.

The process may be executed via the communication module 428 and the communication network 410, which may comprise plural networks as described above. For example, in an exemplary embodiment, the various components of the EBTPM 406 may communicate with the server 404 and the database(s) 412 via the communication module 428 and the communication network 410. Of course, these embodiments are merely exemplary and are not limiting or exhaustive.

According to exemplary embodiments, the communication network 410 and the communication module 428 may be configured to establish a link between the database(s) 412, the client devices 408(1)-408(n) and the EBTPM 406.

According to exemplary embodiments, the defining module 414 may be configured to define a stateful distributed stream queue as a streaming queue which holds stateful computational requests generated at a stream of events. According to exemplary embodiments, each request may contain a context and a collection of queue tasks processed by workers dedicated to the queue.

According to exemplary embodiments, the executing module 416 may be configured to run the stateful distributed stream queue on a cloud infrastructure. The implementing module 418 may be configured to implement the stateful computational requests, by utilizing the stateful distributed stream queue, at the stream of events. The clustering module 420 may be configured to cluster the queue tasks into affinity sub-queues by implementing configurable classification criteria to indicate that their computation is sped up on particular workers, while workers process tasks specific to their affinity. The implementing module 418 may be further configured to implement abstractions for submitting and automatically re-computing the queue tasks while maintaining queue state between streaming events.

According to exemplary embodiments, the context may include meta information and tasks may include custom computation code invoked for every event, but the disclosure is not limited thereto.

According to exemplary embodiments, the streaming queue may be fault-tolerant with its state stored in a fast-access in-memory cloud storage, wherein the state may include one or more of the following states: request state, task data, current assignment task to worker, and worker state, but the disclosure is not limited thereto.

According to exemplary embodiments, the partitioning module 422 may be configured to partition and the replicating module 424 may be configured to replicate the state. According to exemplary embodiments, partitions may include a state from one or multiple streaming queues and hosted on different servers so that the state access is not a bottleneck when a plurality of workers are accessing it concurrently.

According to exemplary embodiments, in an event of worker failures or reconfigurations (see, e.g., FIG. 10), the executing module 416 may be configured to automatically resubmit and reprocess tasks assigned to a specific worker on the streaming queue at real-time monitored failure events from the cloud infrastructure to minimize the reprocessing time.

According to exemplary embodiments, the calling module 426 may be configured to call a streaming queue application programming interface (API) to compute collections of tasks and aggregate results at the stream of events and to define target latency for an end-to-end computation time per event. According to exemplary embodiments, an application or a service may utilize the streaming queue application programming interface.

Figure 5:
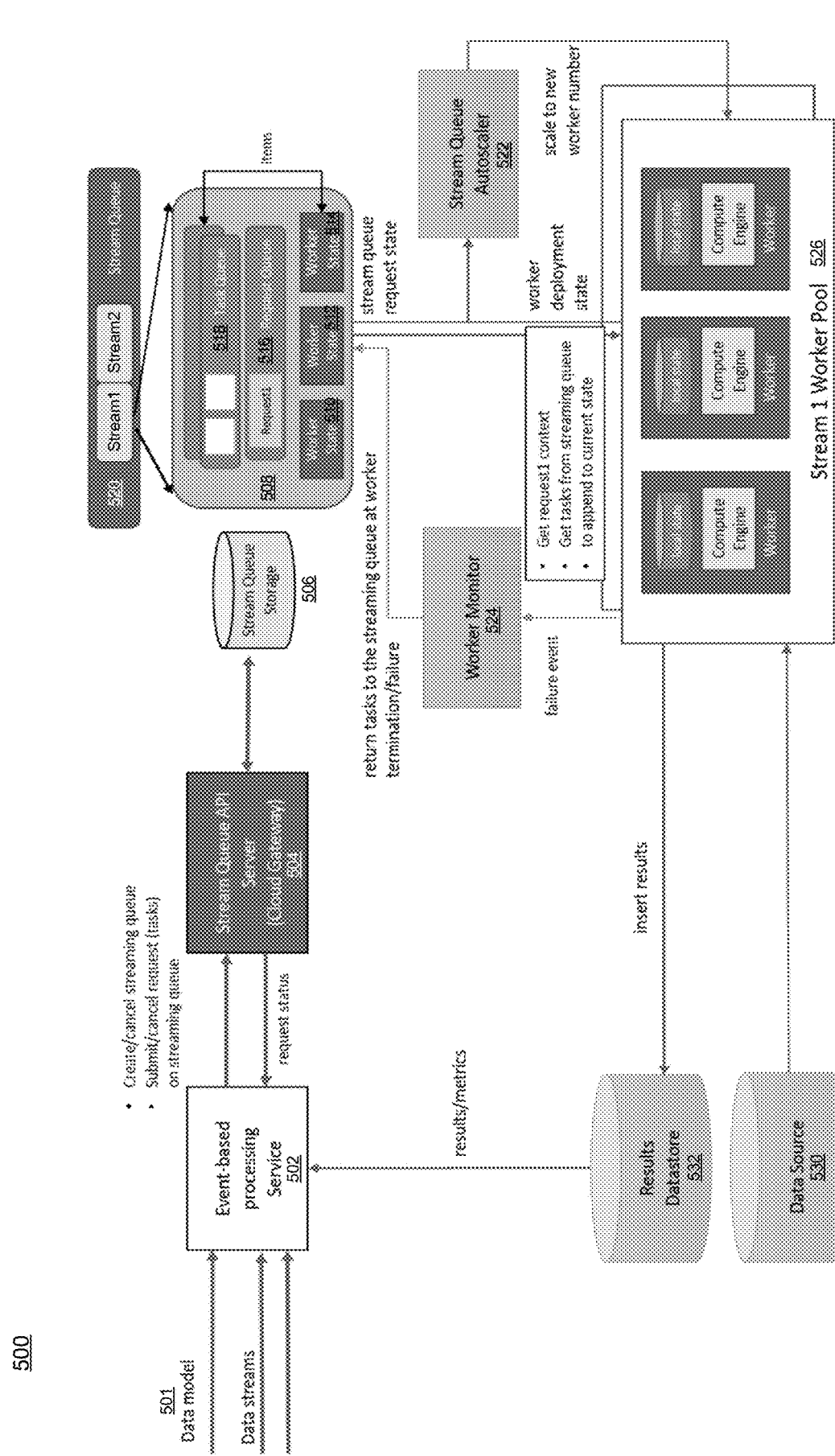
FIG. 5 illustrates an exemplary architecture for an exemplary use case implemented by the platform and language agnostic event-based task processing module of FIG. 4 in accordance with an exemplary embodiment.

FIG. 5 illustrates an exemplary architecture 500 for an exemplary use case implemented by the platform and language agnostic EBTPM 406 of FIG. 4 in accordance with an exemplary embodiment. As illustrated in FIG. 5, the exemplary architecture 500 may include a service block 502 (i.e., event-based processing service) bi-directionally connected to a stream queue API server 504 which is bi-directionally connected with a stream queue storage 506. The exemplary architecture 500 also includes a worker monitor 524, stream 1 508, a stream queue auto-scaler 522, stream 1 worker pool 526, results datastore 532, and a data source 530.

According to exemplary embodiments, streaming queue state (see, e.g., FIG. 6) stores and provides fast access to data from multiple streaming queues sharing the same cluster resources. Stream workers are dedicated workers per streaming queue running a calculation engine for tasks fetched from the streaming queue. Each worker has affinity to tasks with specific characteristics and adapts the number of tasks kept in its state using load shedding, to meet a given SLA per request. Stream queue worker monitor (i.e., 524 in FIG. 5) monitors real-time monitoring of stream queue worker failures due to infrastructure and software errors as well as request cancelation events and automatic work resubmission (tasks are re-assigned to their affinity queues to be picked by available workers). The stream queue auto-scaler 522 is configured to real-time monitoring of requests submitted to the stream queue and feedback-loop based worker scaling. The stream API server is configured for providing an API for creating/canceling a stream queue, managing requests, fetching status changes. Persistent results storage (i.e., results datastore 532) is configured for providing storage for results generated by each worker's calculation engine for its stream queue tasks.

For example, according to exemplary embodiments, the service block 502 may receive, as input, a risk model (i.e., market risk model 501), market data event stream, instrument data/new trading activity stream, and results/metrics (from results datastore 532). The service block 502 may request, as input, status data from the stream queue API server 504 and send data (i.e., create/cancel streaming queue; submit/cancel request (tasks) on streaming queue), as output, to the stream queue API server 504. Output from the stream queue API server 504 may be stored onto the stream queue storage 506. The worker monitor 524 may receive, as input, failure event data from the stream 1 worker pool 526 and return, as output, tasks to the stream queue 520 (i.e., stream 1 508 that may include risk worker state 510, 512, 514, request queue 516, task queue 518) at worker termination or failure. As illustrated in FIG. 5, the stream worker pool 526 may receive data, as input, from the stream queue auto-scaler 522 and the data source 530. Results data (as output) from the stream 1 worker pool 526 may be stored onto the results datastore 532.

Figure 6:
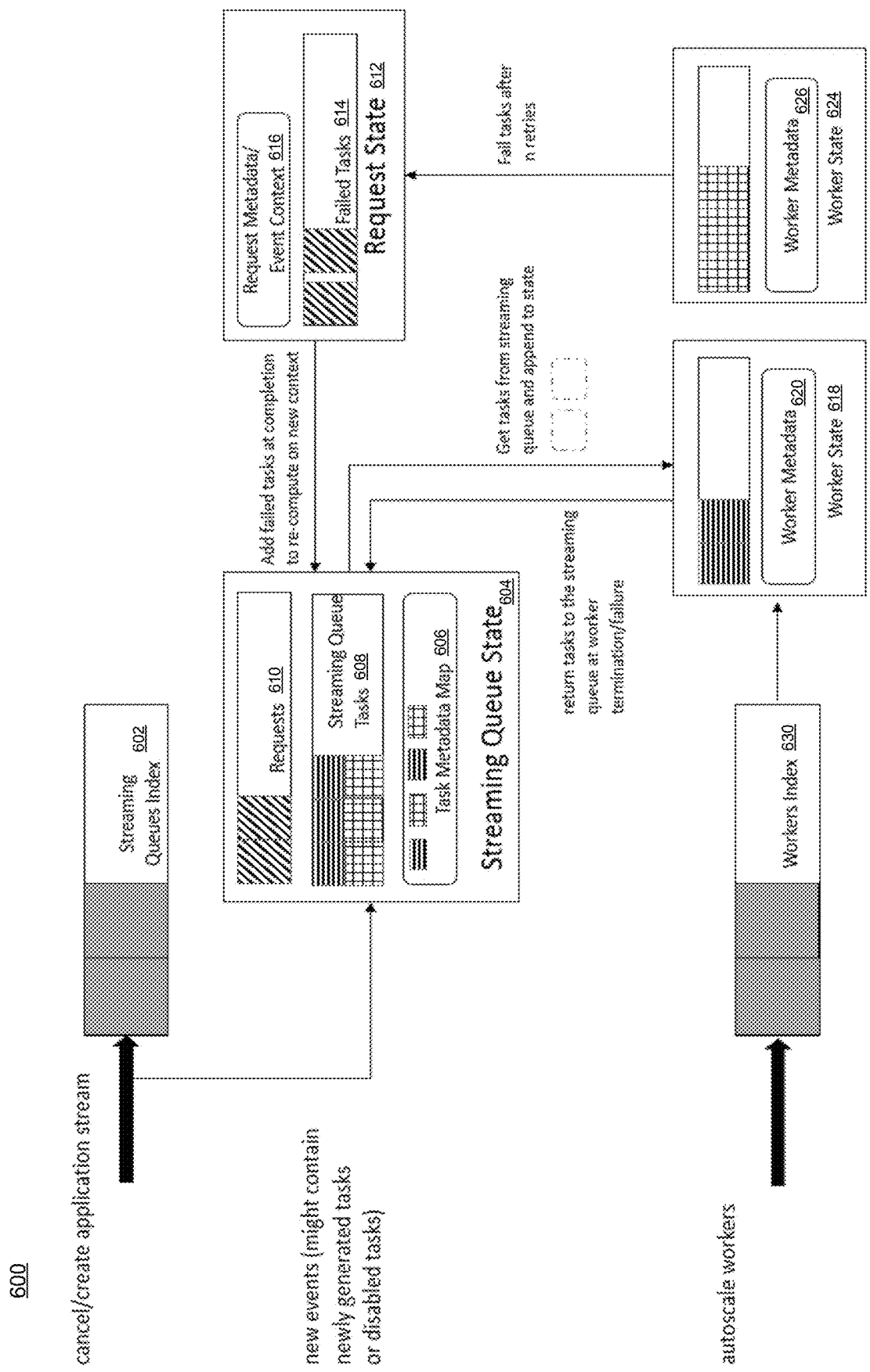
FIG. 6 illustrates an exemplary block diagram of a streaming queue state implemented by the platform and language agnostic event-based task processing module of FIG. 4 in accordance with an exemplary embodiment.

According to exemplary embodiments, FIG. 6 illustrates an exemplary block diagram 600 of a streaming queue state implemented by the platform and language agnostic EBTPM 406 of FIG. 4 in accordance with an exemplary embodiment. As illustrated in FIG. 6, the exemplary block diagram 600 may include streaming queues index block 602; streaming queue state block 604 that may include a task metadata map 606, streaming queue tasks 608, requests 610; request state block 612 that may include failed tasks 614 and request metadata/event context 616; worker state block 618 that may include worker metadata block 620; additional worker state block 624 that may include worker metadata block 626; and workers index block 630 that indexes auto-scale workers.

As illustrated in FIG. 6, cancel/create application stream data may be indexed onto the streaming queues index block 602. New events (that might contain newly generated tasks or disabled tasks) may be input to the streaming queue state block 604. The streaming queue state block 604 may also receive, as input, the cancel/create application stream data; data from the worker state block 618; and data from the request state block 612 (i.e., adding failed tasks at completion to re-compute on new context). For example, the worker state block 618 may receive data, as input, from the worker index block 630 and may return, as output, tasks to the streaming queue (i.e., in the streaming queue state block 604) at worker termination or failure. The request state block 612 may receive, as input, fail tasks 614 after n retries. The worker state block 618 may get tasks (i.e., streaming queue tasks 608) from the streaming queue state block 604 and append to state.

The According to exemplary embodiments, the event-based task processing architecture disclosed herein is based on a stateful distributed stream queue running on cloud. The defining module 414 may define a stream queue as a queue which holds computational requests generated at a stream of events. Each request contains a context (meta information) and a collection of tasks (custom computation code invoked for every event), processed by workers dedicated to the queue; a request is completed when all of its tasks are completed. As disclosed herein, tasks can be clustered using some specific classification criteria into affinity sub-queues. This indicates that their computation is sped up on particular workers, while workers process tasks specific to their affinity as illustrated in FIGS. 7-11 which will be described in detail below.

Referring back to FIGS. 4-6, according to exemplary embodiments, the stream queue 520 may be fault-tolerant with its state (request state, task data, current assignment task to worker, worker state) stored in a fast-access in-memory cloud storage. The state might be partitioned and replicated, with partitions containing state from one or multiple streaming queues and hosted on different servers, to ensure that state access is not a bottleneck when there are a large number of workers accessing it concurrently. As described in more detail below referring to FIG. 10, in the event of worker failures, tasks assigned to a specific worker are automatically resubmitted and reprocessed on the stream queue 520 at real-time monitored failure events from the cloud infrastructure to minimize the reprocessing time.

According to exemplary embodiments, the defining module 414 may be configured to define a stateful stream queue as a stream queue 520 where each request contains a new context, tasks to be disabled, and/or additional tasks. Additional tasks are appended to the existing queue state (one or more queues of tasks), with workers recalculating all tasks, except the disabled ones, from the queue state in the new request context. In the event where the current request is deemed un-processable, due to repeated task errors, workers stop their current calculation and tasks are automatically resubmitted to the stream queue, to be processed in a new request context, avoiding communication overhead from re-creating the tasks in the subsequent request.

According to exemplary embodiments, an application or service can use the stream queue API 504 as illustrated in FIG. 5 to compute collections of tasks and aggregate results at a stream of events and to define target latency for the end to end computation time per event without being concerned on how many workers are running at one point in time and without the complexity of implementing algorithms for dynamic optimal distribution of computation, which is known to be an NP complete problem. The application using the (stateful) stream queue API 504 can subscribe to notifications regarding request status changes provided by the cloud gateway, to react to request completion or encountered task errors as soon as possible. Custom logic can be applied for each case, including result aggregation and error filtering, generation of subsequent requests.

According to exemplary embodiments, to meet stringent SLA constraints for the latency of each processed request, the stream queue 520 is also designed to be elastic, by using continuous monitoring of the queue state/request events and invoking the cloud infrastructure API to grow its compute capacity based on new request requirements, and auto-reconfigurable, by allowing each worker to perform load shedding, (e.g., worker re-queues all its tasks and resets its state) based on current SLA threshold, with newly created workers automatically polling the queue and computing the request tasks in a distributed fashion.

According to exemplary embodiments, a streaming queue auto-scaler 522, as illustrated in FIG. 5 uses an online feedback control loop to change the resource requirements of streaming queue to meet user defined SLAs. According to an exemplary embodiment, such policy might consist in a user-defined heuristic record and keep historical data for the request runtime and increase the number of allocated workers by p percent where p is proportional to the difference between the SLA and the past request runtime, as long as 90% of the worker compute time is close to or above the SLA threshold (there are no idle workers), but the disclosure is not limited thereto.

Another exemplary embodiment might also consider, for example, the state of the infrastructure and the queue (how many workers are running and were processing previous requests) to avoid scaling when the infrastructure is in a bad state (resources cannot be acquired, workers have trouble starting or are not fetching tasks from the queue). If tasks are clustered in affinity queues, then EBTPM 406 may scale the number of workers in a way that there is at least one affinitized worker for each queue. In such case the worker selection strategy might include getting tasks from more than one affinity queue.

According to exemplary embodiments, other user-defined heuristics or machine learning (reinforcement learning) can be adapted by the EBTPM 406 from known methods. For example, a RL (Reinforcement Learning) Q-learning algorithm can be used. In Q-learning an agent trains an approximator of an optimal action-value function Q* used to choose an action to change the state of the observed system (number of workers) such that the cumulated reward (the benefit the agent sees from taking the action, i.e., the change in request performance compared to the threshold SLA) over time is maximized By observing the current reward, the optimization of the Q-function is performed incrementally at each step t (two parameters are used: a learning rate alpha and gamma, a discount factor that serves to balance between the current and future reward. With a probability of 1–e (e represents a trade-off between exploration and exploitation) the agent selects based on the optimal policy and chooses the action that maximizes the expected return from starting in s, i.e., the action with the highest Q-value (Q-values for each state-action combination can be stored in a lookup table).

According to exemplary embodiments, workers may use an adaptive strategy to fetch tasks from the streaming queue and have affinities to particular types of tasks. For example, each worker may fetch tasks from the queue up to a threshold which changes over time, based on the difference between the time it took for the already consumed work and the target SLA of the request. The threshold can be a cost, or a number of tasks, but, according to exemplary embodiments, this threshold is adaptive. This allows for corrections in case the task costs are not accurate and to adapt the task computation to the request SLA. In addition, as part of this adaptive strategy disclosed herein, workers may selectively update the task costs in the streaming queue if there is a noticeable difference between previously recorded values and recent ones.

According to exemplary embodiments, to speed up task/request when requests are received by the cloud gateway, notifications can be sent to workers to overcome the polling delay. The EBTPM 406 may implement managed cloud services to speed up such process.

According to exemplary embodiments, the task collection of the streaming queue may be updated (workers append tasks to compute to an existing state or might disable computation) at an event. An event may contain some metadata/information needed to compute tasks. At task completion workers may update the queue state with the status and additional information. Such information might also contain corrected costs/runtimes of the tasks which can be used in the future for work rebalancing. If the runtime of the worker tasks is higher than the target SLA, or was higher for the past x computations (possibly due to some newly fetched tasks, or increased computation at new events), workers might choose to shed some or all of the load by reassigning tasks to the streaming queue, in which case one or more workers will pick them.

According to exemplary embodiments, stateful streaming queue as disclosed herein may refer to requests generated at new events contain additional tasks appended to the existing queue state, or disabled tasks, with workers recalculating all tasks from the queue state, except the disabled ones, in the new event context.

According to exemplary embodiments, method to make the system elastic to meet stringent SLA constraints may include: using continuous monitoring of the queue state/request events; invoking the cloud infrastructure API to grow its compute capacity based on new request requirements or SLA thresholds; and allowing each worker to perform load shedding, (e.g., worker re-queues all or a part of its tasks and resets its state) based on defined SLA threshold; and with newly created workers, automatically connecting to the queue and computing the request tasks in a distributed fashion, but the disclosure is not limited thereto.

FIGS. 7-10 illustrate the request flow in an exemplary solution. For example, after the first non-empty batch, the worker may continue to look for work in the same stream, even if it remains idle. All workers from the stream may pick work from the first running request in the queue. In addition, workers may periodically check the queue of the stream. A request may contain a context/data model update and possibly tasks updates (added or disabled tasks on the stream).

According to exemplary embodiments, a request flow may include the following: workers keep tasks from previous cycle in their state; a worker adjusts the batch target cost based on previous calculation time to get more tasks such that its SLA is satisfied; if a worker does not meet the SLA then it does load shedding (the simplest algorithm is to exit and have the work resubmitted). Load shedding happens before the worker goes through a new calculation cycle to avoid re-calculation (that is other workers will pick up tasks already processed by the worker). The request flow may further include the following: workers may update task information in the queue state based on statistics accumulated at runtime; task IDs are generated for each worker calculation cycle (where the calculation cycle is triggered by a new request submitted to the stream).

Figure 7:
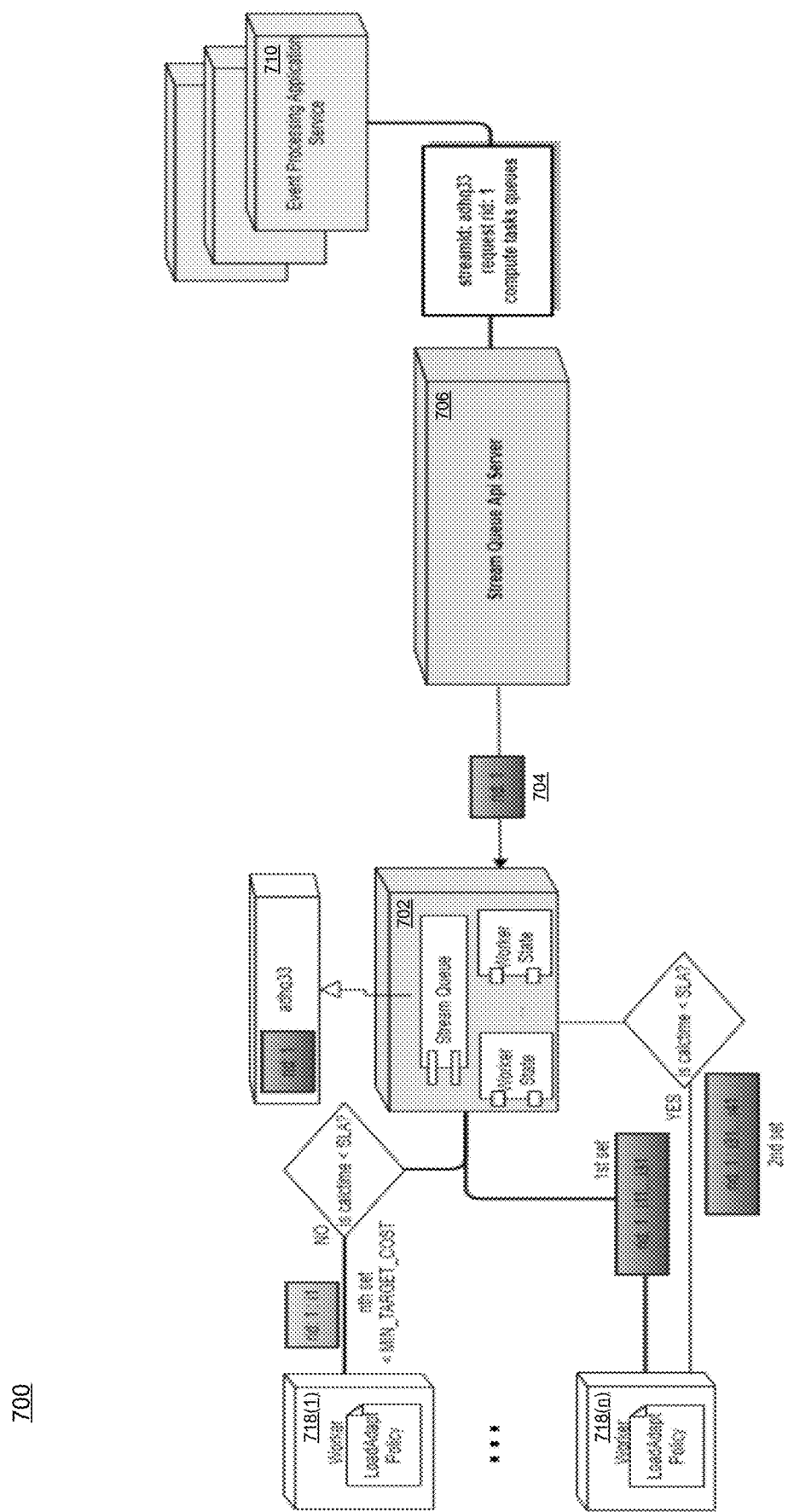
FIG. 7 illustrates an exemplary flow diagram of a first step of an interaction between a worker and a queue implemented by the platform and language agnostic event-based task processing module of FIG. 4 in accordance with an exemplary embodiment.

For example, FIG. 7 illustrates an exemplary flow diagram 700 of a first step of an interaction between a worker and a queue implemented by the platform and language agnostic EBTPM 406 of FIG. 4 in accordance with an exemplary embodiment. The first step may include submission of initial task collection and data model. As illustrated in FIG. 7, a stream queue API server 706 may be operatively connected to a live stream queue 702 and an application service 710. The stream queue 702 receives the first request, rid1 704, from the stream queue API server 706. For example, workers (i.e., workers 718(1) . . . 718(n)) build their initial state by getting tasks from the first request in the queue, rid1 704, until their SLA time is reached. For avoiding cases where the request cannot be finished because all workers go above their target SLA, workers may continue to get tasks, however the batch size will be smaller. This gives the chance for tasks to be evenly distributed among workers 718(1)-718(n).

Figure 8:
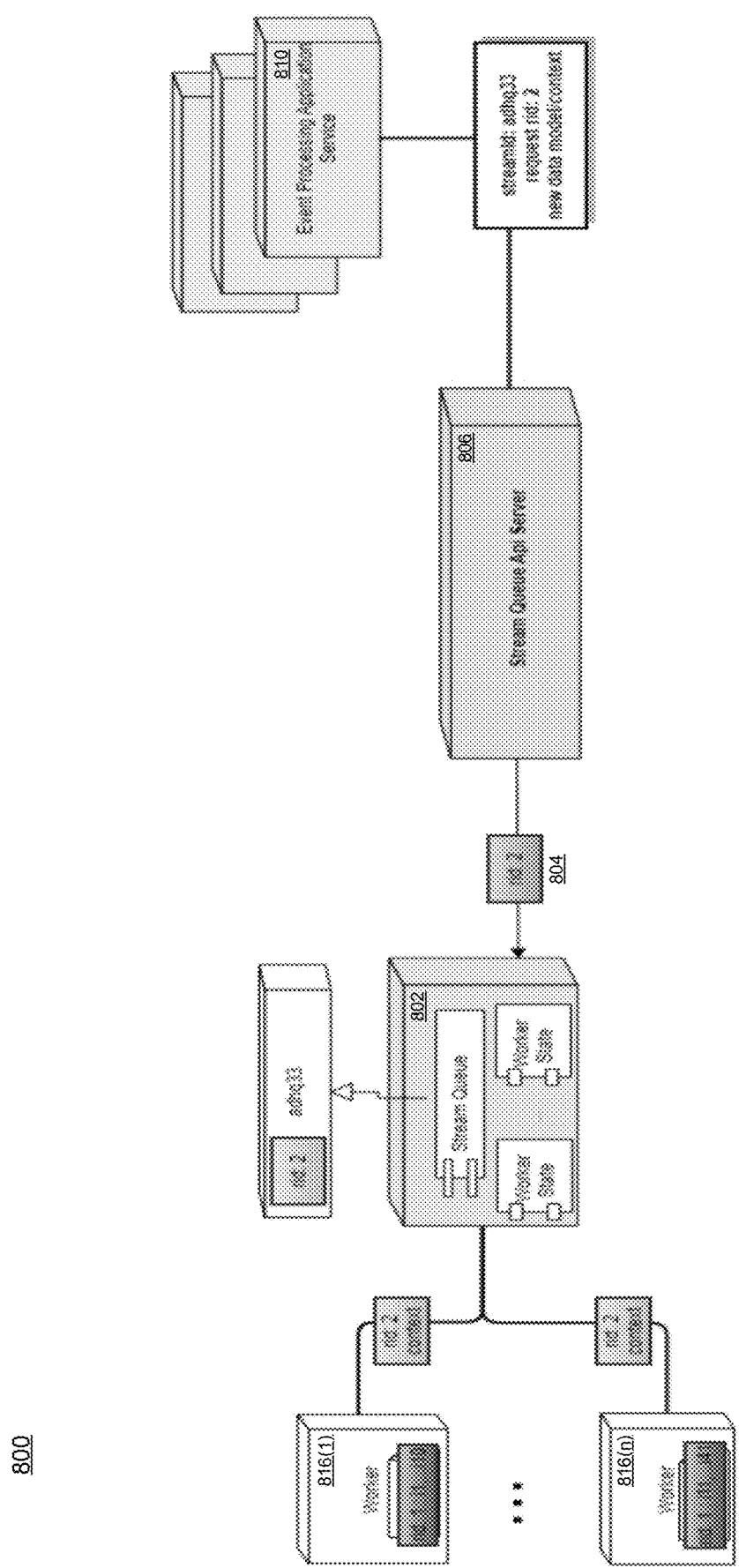
FIG. 8 illustrates an exemplary flow diagram of a second step of an interaction between a worker and a queue implemented by the platform and language agnostic event-based task processing module of FIG. 4 in accordance with an exemplary embodiment.

FIG. 8 illustrates an exemplary flow diagram 800 of a second step of an interaction between a worker and a queue implemented by the platform and language agnostic EBTPM 406 of FIG. 4 in accordance with an exemplary embodiment. The second step may include change in data model/request context. As illustrated in FIG. 8, a stream queue API server 806 may be operatively connected to a stream queue 802 and an application service 810. The stream queue 802 receives the second request, rid2 804, from the stream queue API server 806. For example, existing workers 816(1)-816(n) may have a task assignment computed in the queue state and already the warmed calculation engine (where a warmed calculation state may imply loaded modules, cached precomputed results needed by the current tasks, etc.). Each worker 816(1)-816(n) may compare the ID of the new request with the current one and trigger the task recalculation on the new data model/context.

Figure 9:
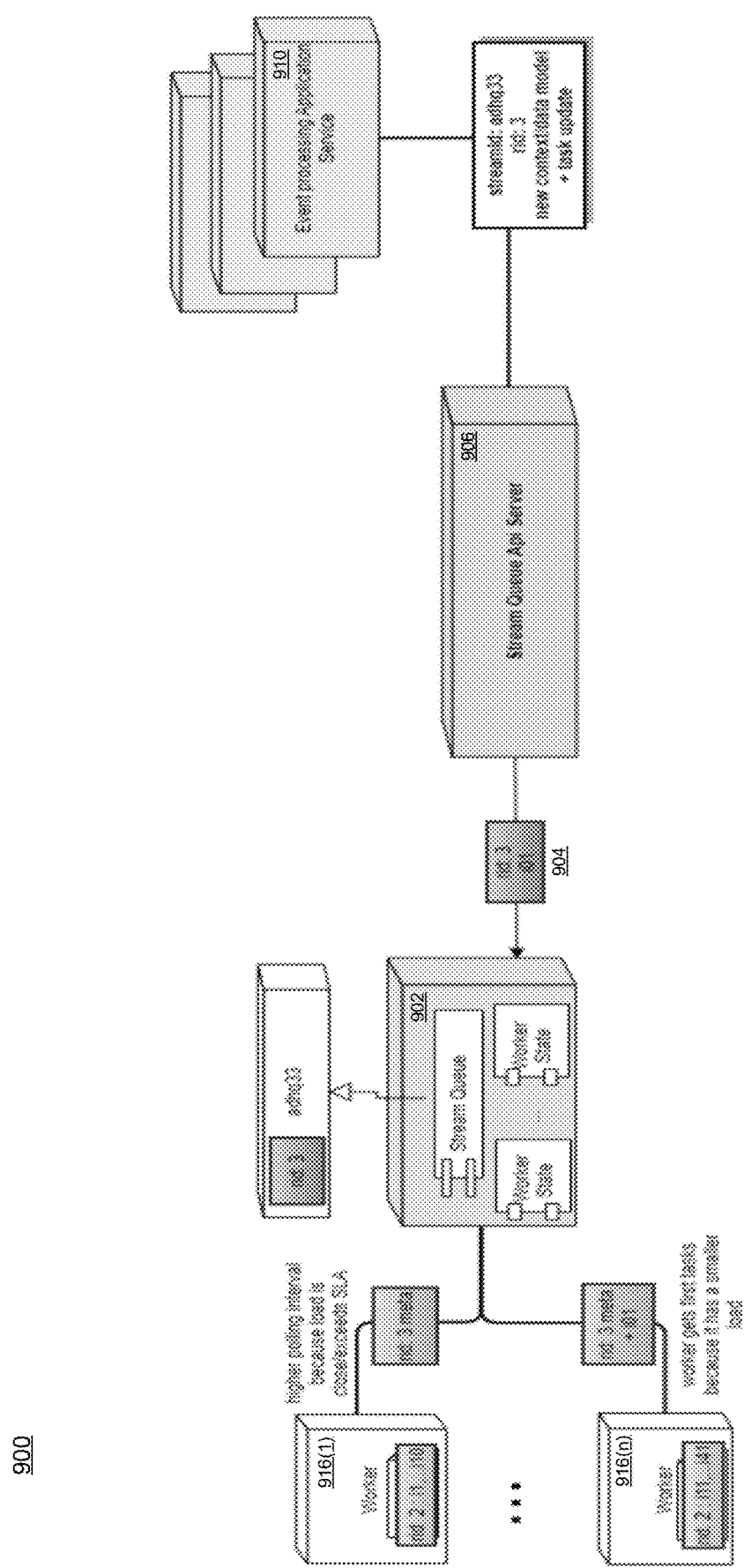
FIG. 9 illustrates an exemplary flow diagram of a third step of an interaction between a worker and a queue implemented by the platform and language agnostic event-based task processing module of FIG. 4 in accordance with an exemplary embodiment.

FIG. 9 illustrates an exemplary flow diagram 900 of a third step of an interaction between a worker and a queue implemented by the platform and language agnostic EBTPM 406 of FIG. 4 in accordance with an exemplary embodiment. The third step may include submission of tasks. As illustrated in FIG. 9, a stream queue API server 906 may be operatively connected to a stream queue 902 and an application service 910. The stream queue 902 receives the third request, rid3 904, from the stream queue API server 906. For example, existing workers 916(1)-916(n) may poll the queue for the next request. New tasks may be sent on the next request. Workers 916(1)-916(n) may append tasks to their state within their SLA and run the calculation engine on the extended set.

Figure 10:
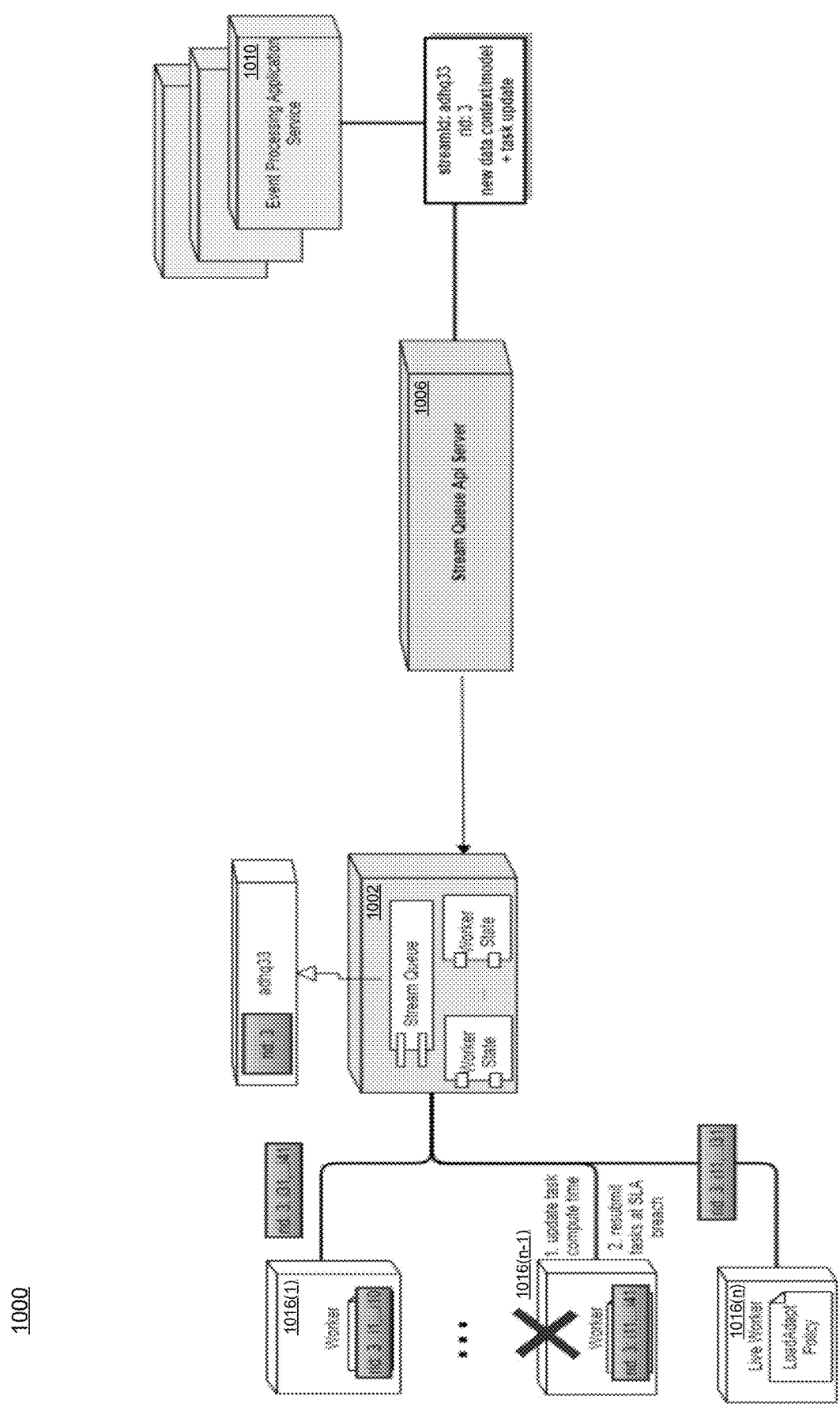
FIG. 10 illustrates an exemplary flow diagram of a worker failure or reconfiguration implemented by the platform and language agnostic event-based task processing module of FIG. 4 in accordance with an exemplary embodiment.

FIG. 10 illustrates an exemplary flow diagram 1000 of a worker failure, respectively reconfiguration scenario implemented by the platform and language agnostic EBTPM 406 of FIG. 4 in accordance with an exemplary embodiment. As illustrated in FIG. 10, a stream queue API server 1006 may be operatively connected to a stream queue 1002 and an application service 1010. The stream queue 1002 may receive data from the stream queue API server 1006. For example, when an existing worker 1016(n-1) fails, its tasks get resubmitted to the existing request queue, with an increased cost. Other workers will pick them. For example, when workers 1016(1)-1016(n) get the next request, they may check if the previous cycle compute time was greater than the SLA (it is important to use a smoothing policy here, e.g., check for the last x cycles, or check after the first y stable cycles) and they apply a load shedding algorithm disclosed herein.

In an exemplary embodiment of the solution, the stream queue compute distribution components are running in containers for which real time failure event monitoring as well as capacity scaling API are provided, e.g., a container orchestrator such as Kubernetes, Nomad, or any container-based solution (AWS ECS), but the disclosure is not limited thereto. The stream queue state may be stored in ElastiCache Redis, an in-memory resilient cloud storage offered by AWS, although the solution is not limited to one cloud provider. Tasks results may be stored in a persistent cloud data storage service, for which an example embodiment can be S3, ElastiCache, to be further aggregated and analyzed, possibly in a real-time fashion, by viewing/analysis tools, but the disclosure is not limited thereto. Redis is an in-memory data structure store, used as a distributed, in-memory key—value database, cache and message broker, with optional durability. Redis supports different kinds of abstract data structures, such as strings, lists, maps, sets, sorted sets, HyperLogLogs, bitmaps, streams, and spatial indices.

This solution has applicability to running parallel computationally intensive applications from the financial domain where calculations are repeated at a stream of events, e.g., distributed pricing and risk measurement of financial portfolios for which positions may change during the day on a stream of market data changes, on High Performance Computing and cloud platforms. Other applications of the solution implemented herein might be for streaming data queries, with queries mapped to stateful stream queue tasks which are repeatedly executed and updated, or online machine learning training, where the machine learning model calculation is split in tasks which are then assigned to workers and recomputed at the data stream.

Figure 11:
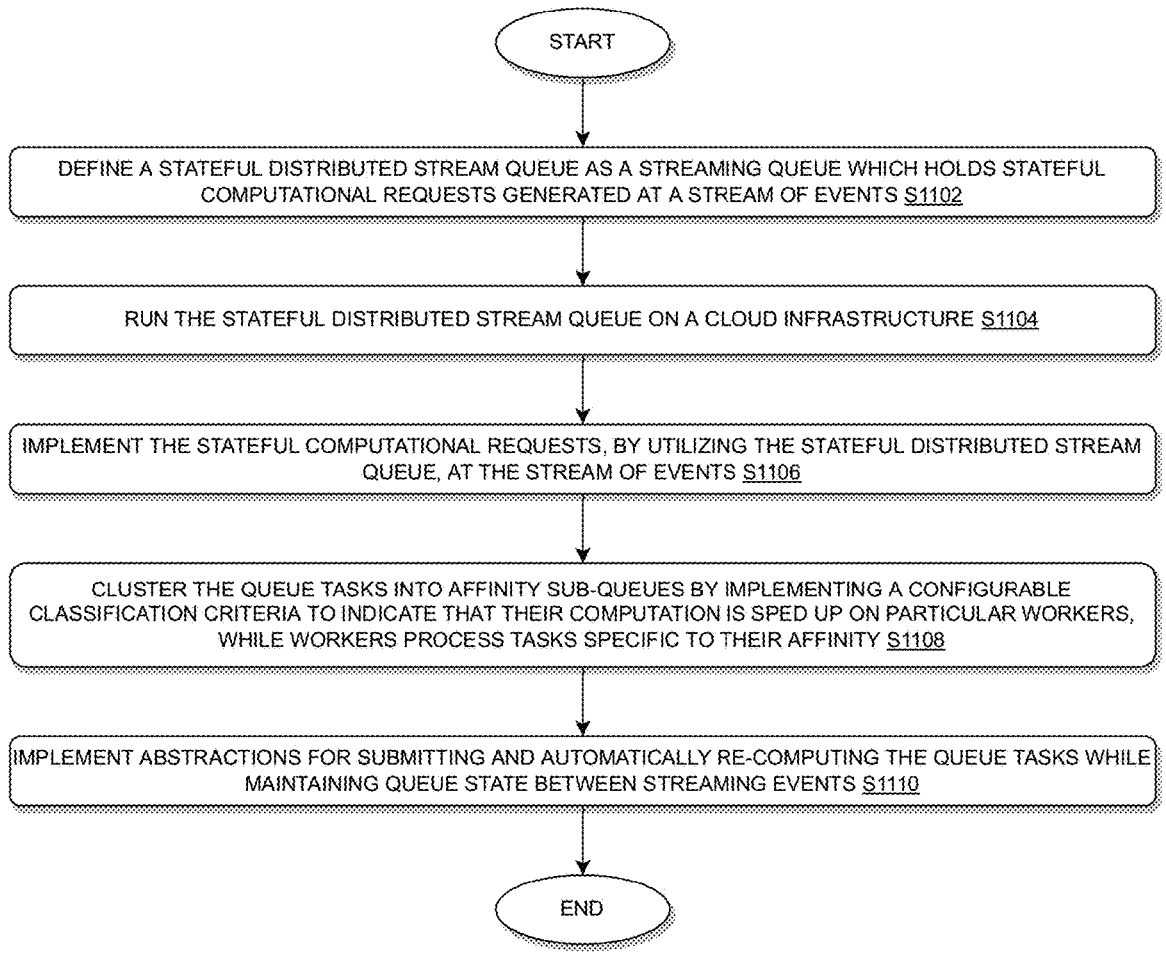
FIG. 11 illustrates a flow chart implemented by the platform and language agnostic event-based task processing module of FIG. 4 for utilizing a distributed queue to store tasks (or functions) and updating them at runtime events to provide stateful computation in accordance with an exemplary embodiment.

FIG. 11 illustrates an exemplary flow chart 1100 implemented by the EBTPM 406 of FIG. 4 for utilizing a distributed queue to store tasks (or functions) and automatically updating them at runtime events to provide stateful computation in accordance with an exemplary embodiment. It will be appreciated that the illustrated process 1100 and associated steps may be performed in a different order, with illustrated steps omitted, with additional steps added, or with a combination of reordered, combined, omitted, or additional steps.

As illustrated in FIG. 11, at step S1102, the process 1100 may include defining a stateful distributed stream queue as a streaming queue which holds stateful computational requests generated at a stream of events, wherein each request contains a context and a collection of queue tasks processed by workers dedicated to the queue.

At step S1104, the process 1100 may include running the stateful distributed stream queue on a cloud infrastructure.

At step S1106, the process 1100 may include implementing the stateful computational requests, by utilizing the stateful distributed stream queue, at the stream of events.

At step S1108, the process 1100 may include clustering the queue tasks into affinity sub-queues by implementing configurable classification criteria to indicate that their computation is sped up on particular workers, while workers process tasks specific to their affinity.

At step S1110, the process 1100 may include implementing abstractions for submitting and automatically re-computing the queue tasks while maintaining queue state between streaming events.

According to exemplary embodiments, the process 1100 may further include: partitioning and replicating the state, wherein partitions include a state from one or multiple streaming queues and hosted on different servers so that the state access is not a bottleneck when a plurality of workers are accessing it concurrently.

According to exemplary embodiments, in an event of worker failures, the process 1100 may further include: automatically resubmitting and reprocessing tasks assigned to a specific worker on the streaming queue at real-time monitored failure events from the cloud infrastructure to minimize the reprocessing time.

According to exemplary embodiments, the process 1100 may further include: calling a streaming queue application programming interface to compute collections of tasks and aggregate results at the stream of events and to define target latency for an end-to-end computation time per event.

According to exemplary embodiments, the EBTPD 402 may include a memory (e.g., a memory 106 as illustrated in FIG. 1) which may be a non-transitory computer readable medium that may be configured to store instructions for implementing a EBTPM 406 for automated event-based task processing as disclosed herein. The EBTPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the EBTPM 406 or within the EBTPD 402, may be used to perform one or more of the methods and processes as described herein. In a particular embodiment, the instructions may reside completely, or at least partially, within the memory 106, the medium reader 112, and/or the processor 104 (see FIG. 1) during execution by the EBTPD 402.

According to exemplary embodiments, the instructions, when executed, may cause a processor 104 embedded within the EBTPM 406 or the EBTPD 402 to perform the following: defining a stateful distributed stream queue as a streaming queue which holds stateful computational requests generated at a stream of events, wherein each request contains a context and a collection of queue tasks processed by workers dedicated to the queue; running the stateful distributed stream queue on a cloud infrastructure; implementing the stateful computational requests, by utilizing the stateful distributed stream queue, at the stream of events; and clustering the queue tasks into affinity sub-queues by implementing configurable classification criteria to indicate that their computation is sped up on particular workers, while workers process tasks specific to their affinity; and implementing abstractions for submitting and automatically re-computing the queue tasks while maintaining queue state between streaming events.

According to exemplary embodiments, the instructions, when executed, may further cause the processor 104 to perform the following: partitioning and replicating the state, wherein partitions include a state from one or multiple streaming queues and hosted on different servers so that the state access is not a bottleneck when a plurality of workers are accessing it concurrently.

According to exemplary embodiments, in an event of worker failures, the instructions, when executed, may further cause the processor 104 to perform the following: automatically resubmitting and reprocessing tasks assigned to a specific worker on the streaming queue at real-time monitored failure events from the cloud infrastructure to minimize the reprocessing time.

According to exemplary embodiments, the instructions, when executed, may further cause the processor 104 to perform the following: calling a streaming queue application programming interface to compute collections of tasks and aggregate results at the stream of events and to define target latency for an end-to-end computation time per event.

According to exemplary embodiments as disclosed above in FIGS. 1-12, technical improvements effected by the instant disclosure may include a platform for implementing a platform and language agnostic event-based task processing module configured to utilize a distributed queue to store tasks (or functions) and update them at runtime events to provide stateful computation, making elasticity, load-balancing and scalability needed to meet SLAs easier to obtain, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for event-based task processing by utilizing one or more processors along with allocated memory, the method comprising:
   defining a stateful distributed stream queue as a streaming queue which holds stateful computational requests generated at a stream of events, wherein each request contains a context and a collection of queue tasks processed by workers dedicated to the queue;
   running the stateful distributed stream queue on a cloud infrastructure;
   implementing the stateful computational requests, by utilizing the stateful distributed stream queue, at the stream of events; and
   clustering the queue tasks into affinity sub-queues by implementing configurable classification criteria to indicate that their computation is sped up on particular workers, while workers process tasks specific to their affinity; and
   implementing abstractions for submitting and automatically re-computing the queue tasks while maintaining queue state between streaming events.

2. The method according to claim 1, wherein the context includes meta information and tasks include custom computation code invoked for every event.

3. The method according to claim 1, wherein the streaming queue is fault-tolerant with its state stored in a fast-access in-memory cloud storage, wherein the state includes one or more of the following states: request state, task data, current assignment task to worker, and worker state.

4. The method according to claim 3, further comprising:
   partitioning and replicating the state, wherein partitions include a state from one or multiple streaming queues and hosted on different servers so that the state access is not a bottleneck when a plurality of workers are accessing it concurrently.

5. The method according to claim 4, in an event of worker failures, the method further comprising:
   automatically resubmitting and reprocessing tasks assigned to a specific worker on the streaming queue at real-time monitored failure events from the cloud infrastructure to minimize the reprocessing time.

6. The method according to claim 1, further comprising:
   calling a streaming queue application programming interface to compute collections of tasks and aggregate results at the stream of events and to define target latency for an end-to-end computation time per event.

7. The method according to claim 6, wherein an application or service utilizes the streaming queue application programming interface.

8. A system for event-based task processing by utilizing one or more processors along with allocated memory, the system comprising:
   a processor; and
   a memory operatively connected to the processor via a communication interface, the memory storing computer readable instructions, when executed, causes the processor to:
   define a stateful distributed stream queue as a streaming queue which holds stateful computational requests generated at a stream of events, wherein each request contains a context and a collection of queue tasks processed by workers dedicated to the queue;
   run the stateful distributed stream queue on a cloud infrastructure;
   implement the stateful computational requests, by utilizing the stateful distributed stream queue, at the stream of events; and cluster the queue tasks into affinity sub-queues by implementing configurable classification criteria to indicate that their computation is sped up on particular workers, while workers process tasks specific to their affinity; and implement abstractions for submitting and automatically re-computing the queue tasks while maintaining queue state between streaming events.

9. The system according to claim 8, wherein the context includes meta information and tasks include custom computation code invoked for every event.

10. The system according to claim 8, wherein the streaming queue is fault-tolerant with its state stored in a fast-access in-memory cloud storage, wherein the state includes one or more of the following states: request state, task data, current assignment task to worker, and worker state.

11. The system according to claim 10, wherein the processor is further configured to:

partition and replicate the state, wherein partitions include a state from one or multiple streaming queues and hosted on different servers so that the state access is not a bottleneck when a plurality of workers are accessing it concurrently.

12. The system according to claim 11, in an event of worker failures, the processor is further configured to:

automatically resubmit and reprocess tasks assigned to a specific worker on the streaming queue at real-time monitored failure events from the cloud infrastructure to minimize the reprocessing time.

13. The system according to claim 8, wherein the processor is further configured to:

call a streaming queue application programming interface to compute collections of tasks and aggregate results at the stream of events and to define target latency for an end-to-end computation time per event.

14. The system according to claim 13, wherein an application or service utilizes the streaming queue application programming interface.

15. A non-transitory computer readable medium configured to store instructions for event-based task processing, the instructions cause a processor to perform the following:

defining a stateful distributed stream queue as a streaming queue which holds stateful computational requests generated at a stream of events, wherein each request contains a context and a collection of queue tasks processed by workers dedicated to the queue;

running the stateful distributed stream queue on a cloud infrastructure;

implementing the stateful computational requests, by utilizing the stateful distributed stream queue, at the stream of events; and clustering the queue tasks into affinity sub-queues by implementing configurable classification criteria to indicate that their computation is sped up on particular workers, while workers process tasks specific to their affinity; and implementing abstractions for submitting and automatically re-computing the queue tasks while maintaining queue state between streaming events.

16. The non-transitory computer readable medium according to claim 15, wherein the context includes meta information and tasks include custom computation code invoked for every event.

17. The non-transitory computer readable medium according to claim 15, wherein the streaming queue is fault-tolerant with its state stored in a fast-access in-memory cloud storage, wherein the state includes one or more of the following states: request state, task data, current assignment task to worker, and worker state.

18. The non-transitory computer readable medium according to claim 17, wherein the instructions, when executed, cause the processor to further perform the following:

partitioning and replicating the state, wherein partitions include a state from one or multiple streaming queues and hosted on different servers so that the state access is not a bottleneck when a plurality of workers are accessing it concurrently.

19. The non-transitory computer readable medium according to claim 18, in an event of worker failures, the instructions, when executed, cause the processor to further perform the following:

automatically resubmitting and reprocessing tasks assigned to a specific worker on the streaming queue at real-time monitored failure events from the cloud infrastructure to minimize the reprocessing time.

20. The non-transitory computer readable medium according to claim 15, wherein the instructions, when executed, cause the processor to further perform the following:

calling a streaming queue application programming interface to compute collections of tasks and aggregate results at the stream of events and to define target latency for an end-to-end computation time per event, wherein an application or service utilizes the streaming queue application programming interface.

* * * * *